United States Patent [19]

Carlson et al.

[11] 4,083,260

[45] Apr. 11, 1978

[54] ENDLESS POWER TRANSMISSION BELT

[75] Inventors: Douglas W. Carlson; Jack Nelson, both of Springfield, Mo.

[73] Assignee: Dayco Corporation, Dayton, Ohio

[21] Appl. No.: 790,719

[22] Filed: Apr. 25, 1977

[51] Int. Cl.² .............................................. F16G 5/16
[52] U.S. Cl. ...................................................... 74/233
[58] Field of Search ........................ 74/233, 234, 231 P

[56] References Cited
U.S. PATENT DOCUMENTS 3,584,516  6/1971  Bupulis ................................. 74/233

*Primary Examiner*—Leonard H. Gerin
*Attorney, Agent, or Firm*—Reuben Wolk

[57] ABSTRACT

An endless power transmission belt is provided which has a twisted helically wound load-carrying cord provided in its load-carrying section with the twisting of such cord being according to an empirical equation and being substantially greater than in previously proposed belts whereby such belt has improved performance characteristics.

20 Claims, 4 Drawing Figures

U.S. Patent     April 11, 1978     4,083,260
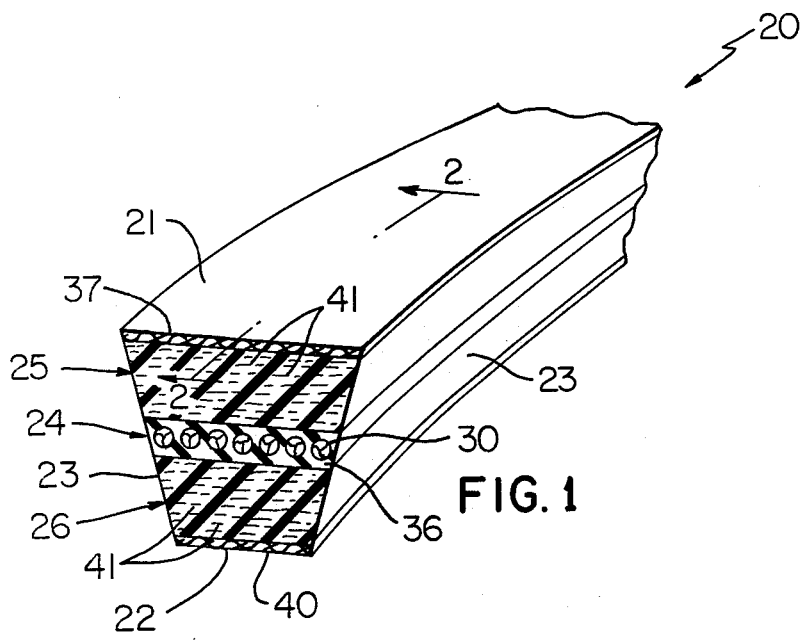
FIG. 1
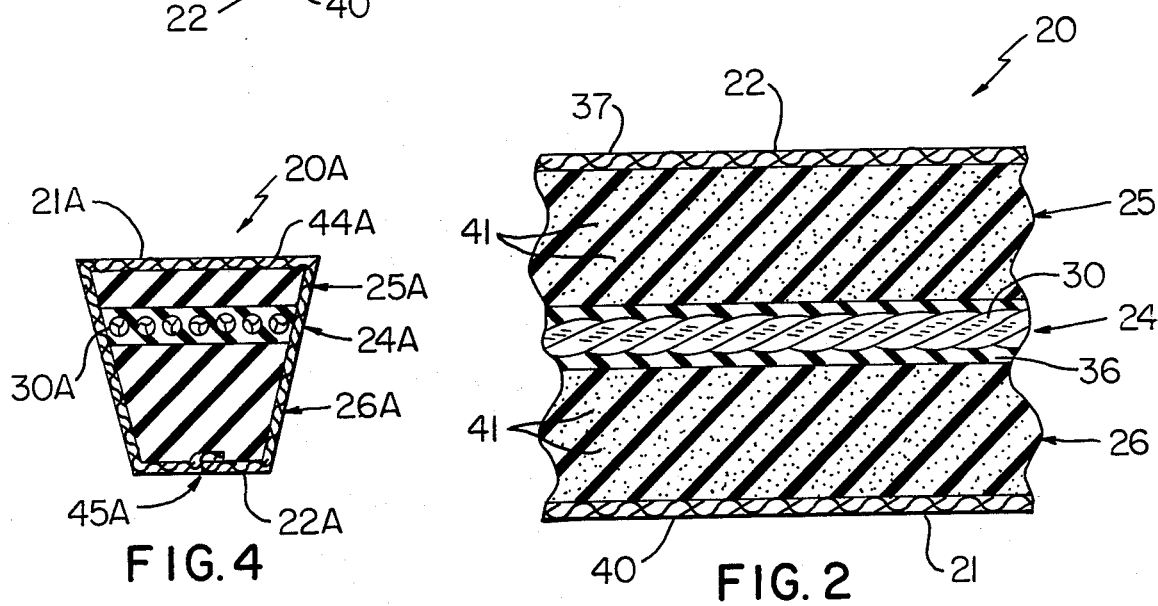
FIG. 4
FIG. 2
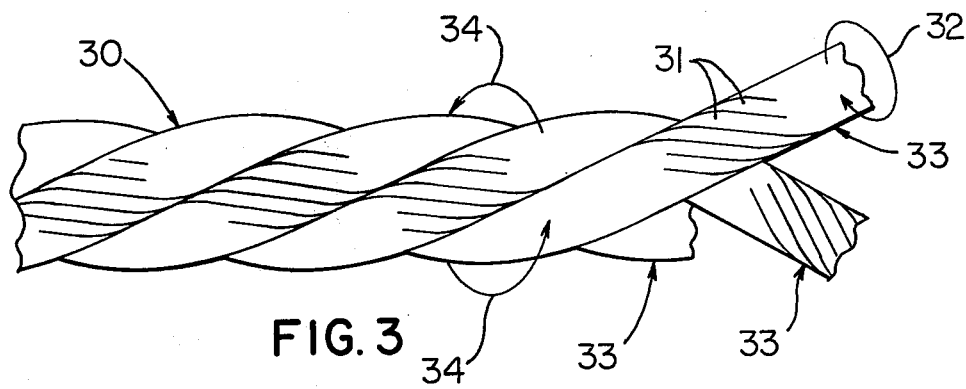
FIG. 3

ENDLESS POWER TRANSMISSION BELT

BACKGROUND OF THE INVENTION

Endless power transmission belts, popularly referred to as V-belts, are widely used throughout industry and such belts often have a helically wound load-carrying cord defined by a plurality of twisted plies. Heretofore, substantial twisting of the cord plies was not achieved because it was considered detrimental to belt performance and service life.

SUMMARY

It is a feature of this invention to provide a simple and economical trapezoidal endless power transmission belt having a load-carrying section which has a load-carrying cord which is highly twisted compared to previous belts.

Another feature of this invention is to provide a belt of the character mentioned which has improved resistance to flex induced fatigue failure, reduced cord fray, improved cutting characteristics, and increased elasticity.

Another feature of this invention is to provide an endless power transmission belt comprising a load-carrying section wherein such load-carrying section has a twisted helically wound load-carrying cord disposed therein which is defined in terms of a twist multiplier having a numerical value in the range of between 4 and 8 and with the twist multiplier being expressed by an empirically determined equation as set forth herein.

Another feature of this invention is to provide an endless power transmission belt of the character mentioned having a load-carrying cord made of yarns twisted in accordance with an empirical equation similar to the above-mentioned equation.

Therefore, it is an object of this invention to provide an endless power transmission belt having one or more of the novel features set forth above or hereinafter shown or described.

Other objects, features, details, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a fragmentary perspective view illustrating one exemplary embodiment of an endless power transmission belt of this invention;

FIG. 2 is an enlarged cross-sectional view taken essentially on the line 2—2 of FIG. 1;

FIG. 3 is a greatly enlarged fragmentary view of the cord employed in the belt of FIG. 1; and FIG. 4 is a cross-sectional view of another exemplary embodiment of an endless power transmission belt of this invention.

DESCRIPTION OF ILLUSTRATED EMBODIMENTS

Reference is now made to FIG. 1 of the drawing which illustrates an exemplary embodiment of an endless power transmission belt structure or belt of this invention which is designated generally by the reference numeral 20 and such belt 20 is of trapezoidal cross-sectional outline and is popularly referred to as a V-belt. The belt 20 has a pair of opposed parallel surfaces, when viewed in cross-section, defined by an outside surface 21 and an inside surface 22 with the surfaces 21 and 22 being connected at their opposite edges by symmetrically arranged side surfaces each designated by the same reference numeral 23 with the surfaces 23 defining the non-parallel sides of the trapezoidal cross-section.

The exemplary belt 20 has a load-carrying section which is designated generally by the reference numeral 24 which is arranged midway between the outside surface 21 and the inside surface 22 and because the practice in the industry is to refer to the load-carrying section as the neutral axis of the belt the positioning of the load-carrying section 24 midway between surfaces 21 and 22 results in defining what is popularly referred to as belt 20 having a central neutral axis. The belt 20 also comprises a tension section 25 and a compression section 26 with the load-carrying section 24 being disposed between the sections 25 and 26.

The load-carrying section 24 has as its load-carrying means a comparatively highly twisted helically wound load-carrying cord 30 defined in accordance with the teachings of this invention whereby the belt 20 has improved performance characteristics. In particular, the belt 20 has improved resistance to flex induced fatigue failure, reduced tendency for the cord 30 to fray during operation of such belt 20 in associated sheaves, improved cutting characteristics in that the belt 20 defined from an associated belt sleeve in the usual manner known in the art can be more readily cut from such sleeve with minimum tendency for the cut ends to fray or project from the side surfaces 23 of the associated belt thus defined, and the belt 20 has substantially increased elasticity enabling such belt to be operated reliably around associated sheaves with comparatively long service life.

The load-carrying cord 30 of the belt 20 is comparatively highly twisted as indicated earlier and such twisting is substantially greater than the twisting provided in similar helically wound cords of endless power transmission belts proposed heretofore. The twist of such cord is best defined by what will be referred to as a twist multiplier having a numerical value in the range between 4 through 8 with the twist multiplier expressed by the equation: $TM = t \times d^{1/2} \times K$ where $TM$ is the twist multiplier expression, $t$ is the twist of the cord in turns per inch, $d$ is the denier of the cord, and $K$ is a constant for the particular material used to define the cord. The above equation has been determined empirically and it has been found that belts having a load-carrying cord twisted in terms of a twist multiplier within the range of 4 – 8 provide improved performance over previous belts. The equation takes into account cord material with the constant K being determined by such material, cord twist in terms of turns per inch, and the denier of the cord.

The cord 30 is made of a plurality of twisted yarns which are preferably of the same size and are preferably twisted to define plies. The individual yarns and plies are also twisted in accordance with the twist multiplier equation indicated above with each term of the equation being as explained before with the exception of the denier which in case of a particular yarn refers to the denier of the yarn and in the case of a ply refers to the denier of the ply. As in the case of the overall cord each yarn and ply should satisfy the twist multiplier equation and be within the range of 4 –8.

The exemplary cord 30 of the belt 20 is made of a plurality of two twisted yarns 31 twisted in one direction as indicated by the arrow 32 in FIG. 3 to define a twisted ply 33. A plurality of three plies 33 thus defined are twisted in an opposite direction as indicated by the arrow 34 to define the cord 30.

Any desired plurality of yarns 31 may be twisted in the one direction to form a ply 33. Similarly, any desired number of plies 33 may be twisted in a direction opposite from the one direction to define the cord 30. However, regardless of the number of yarns in a ply, and the number of plies used to define a cord, each yarn 31, ply 33 and the overall cord 30 preferably has a resorcinalformaldehyde - latex material popularly referred to as RFL dispersed therethrough. Although any technique may be employed for dispersal of the RFL such dispersal is preferably achieved by impregnating an RFL solution into the yarn, ply, or cord following twisting thereof.

The RFL serves to initially hold the yarns and plies, twisted and once the cord 30 is suitably embedded in its associated belt and cured into position the cord twist is permanent with the rest of the belt structure. The RFL material may be of any suitable type employed in the art and as indicated above is preferably a solution applied immediately following twisting of the yarns into plies and again as a solution applied immediately following twisting of the plies into a cord. The application is preferably achieved by moving each ply and then the cord through a liquid dip of RFL.

The load-carrying cord 30 is suitably embedded in an elastomeric cushion which is designated by the reference numeral 36 and in accordance with techniques which are well known in the art and the cushion 36 comprises the load-carrying section 24. The cushion 36 may be made of any suitable material known in the art such as a soft rubber, for example.

The tension section 25 of the belt 20 has a fabric cover 37 thereon, the outside surface of which defines the outside surface 21 of the belt 20. Similarly, the compression section 26 has a fabric cover 40 thereon the outside surface of which defines the inside surface 22 of the belt 20. The covers 37 and 40 may be made employing any suitable fabric employed in the art of making belts.

Each of the sections 25 and 26 also has a plurality of randomly arranged fibers embedded therein, a representative few of which are designated by the reference numeral 41. The fibers 41 allow the belt 20 to be operated in its endless path with unimpaired longitudinal flexibility while providing transverse rigidity or stiffness for such belt, i.e., stiffness transverse the longitudinal axis of the belt. The fibers 41 may be made of any suitable material known in the art.

Each of the sections 24, 25, and 26 of the belt 20 is preferably made primarily of a polymeric material in the form of a rubber compound with the only exceptions being the fibers 41, fabric covers 37 and 40, and the load-carrying cord 30.

Another exemplary embodiment of the belt structure or belt of this invention is illustrated in FIG. 4 of the drawing. The belt illustrated in FIG. 4 is very similar to the belt 20; therefore, such belt will be designated by the reference numeral 20A and representative parts of the belt 20A which are similar to corresponding parts of the belt 20 will be designated in the drawing by the same reference numerals as in the belt 20 (whether or not such representative parts are mentioned in the specification) followed by the letter designation "A" and not described again in detail. Only those parts of the belt 20A which are substantially different from the belt 20 will be designated by a new reference numeral, also followed by the letter designation "A" and described in detail.

The belt 20A of FIG. 4 has a tension section 25A, a load-carrying section 24A, and a compression section 26A. The main differences in the belt 20A and the belt 20 is that the belt 20A is of a more commonly used type in that it has its load-carrying section 24A disposed closer to its outside surface 21A than to its inside surface 22A. The belt 20A also has a fabric cover designated by the reference numeral 44A which extends completely around the periphery of the belt as viewed in cross-section with an overlapping inside surface as indicated at 45A whereby exemplary belt 20A is what is popularly referred to as a wrapped belt. However, the belt 20A need not necessarily be a wrapped belt but may have raw-edged non-parallel sides in a similar manner as the belt 20. Further, both exemplary belts 20 and 20A may be raw-edged or minus covers about their entire peripheries.

The load-carrying cord 30A of the belt 20A and the yarns and plies comprising such cord are defined in accordance with the twist multiplier equation previously expressed for belt 20. In addition the cord also has RFL disposed throughout such cord in its twisted condition with the RFL being provided in a similar manner as previously explained for belt 20.

The belts 20 and 20A with their unique load-carrying cords 30 and 30A respectively may be made utilizing any suitable technique known in the art; however, regardless of the technique employed it will be appreciated that each of such belts has the improved characteristics previously described due to the unique manner in which each yarn, ply, and cord is twisted in each instance in accordance with the twist multiplier equation set forth previously.

As indicated previously any desired plurality of yarns 31 may be twisted in one direction to form a ply 33 and similarly any desired number of plies 33 may be twisted in an opposite direction to define the cord 30, for example. The twisting of the yarns in one direction and the plies in an opposite direction may be the same in turns per inch or such twisting may be different in turns per inch. For example, in one application of this invention a plurality of yarns were twisted 5.2 turns per inch in one direction to define a ply and the plies twisted 2.2 turns per inch in an opposite direction to define the overall cord. However, it is to be understood that the twisting of yarns and plies need not necessarily be in opposite directions.

In a so-called central neutral axis (CNA) belt having a load-carrying cord defined in accordance with this invention it has been found that such load-carrying cord has improved pop-out resistance which is approximately 60% better than the pop-out resistance of a similar cord produced by previous techniques and used in a similar previous CNA belt; and, with the overall CNA belt providing performance equal to the previous CNA belt in all other respects. In addition, because of the unique twisted cord taught by this invention, CNA belts made using same have optimum resiliency.

Any suitable material may be employed to make the yarns, plies, and the overall cord of this invention. Preferably fibrous materials are used and such fibrous materials may include glass, polyester, polyamide, aramid, rayon, acrylic, and the like. It will be appreciated that these are merely examples of materials and should not be considered as limiting in any way.

It will also be appreciated that the numerical value of the empirically determined constant K will vary for each material and generally will be between 70 and 95. For example, the value of K for polyester and nylon has been determined to be roughly 73, for aramid roughly 68, and for glass roughly 90.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt comprising a load-carrying section, said load-carrying section having a twisted helically wound load-carrying cord disposed therein which is defined in terms of a twist multiplier having a numerical value in the range of between 4 – 8, said twist multiplier being expressed by the equation:

$$TM = t \times d^{\frac{1}{2}} \times K$$

where $TM$ is the twist multiplier expression, $t$ is the twist of the cord in turns per inch, $d$ is denier of the cord, and $K$ is a constant for the particular material used to define the cord.

2. A belt as set forth in claim 1 in which said cord is made of a plurality of twisted yarns.

3. A belt as set forth in claim 2 in which said cord is made of a plurality of twisted yarns twisted in one direction to form a ply and a plurality of plies thus defined twisted in an opposite direction to define said cord.

4. A belt as set forth in claim 2 in which each of said yarns is made of a synthetic material.

5. A belt as set forth in claim 2 in which each of said yarns is made of a synthetic polymeric material.

6. A belt as set forth in claim 2 in which each of said yarns has solidified RFL disposed therethrough.

7. A belt as set forth in claim 3 in which each of said yarns and plies has RFL impregnated therein helping to hold same in its twisted condition following twisting thereof.

8. A belt as set forth in claim 3 in which said twist of said plies in turns per inch in said opposite direction is approximately equal to the twist of said yarns in turns per inch in said one direction.

9. A belt as set forth in claim 3 in which said twist of said plies in turns per inch in said opposite direction is different to the twist of said yarns in turns per inch in said one direction.

10. A belt as set forth in claim 1 in which said load-carrying section comprises a polymeric cushion supporting said load-carrying cord.

11. An endless substantially trapezoidal power transmission belt comprising a tension section, a compression section, and a load-carrying section disposed between said tension and compression sections, said load-carrying section having a twisted helically wound load-carrying cord disposed therein which is defined in terms of a twist multiplier having a numerical value in the range between 4 – 8, said twist multiplier being expressed by the equation:

$$TM = t \times d^{\frac{1}{2}} \times K$$

where $TM$ is the twist multiplier expression, $t$ is the twist of the cord in turns per inch, $d$ is denier of the cord, and $K$ is a constant for the particular material used to define the cord.

12. A belt as set forth in claim 11 in which said cord is made of a plurality of twisted yarns twisted in one direction to form a ply and a plurality of plies thus defined twisted in an opposite direction to define said cord.

13. A belt as set forth in claim 12 in which said tension section has a surface defining the outside surface of said belt, and said compression section has a surface defining the inside of said belt, said load-carrying cord being disposed midway between said inside and outside surfaces.

14. A belt as set forth in claim 12 in which said load-carrying cord is disposed closer to said outside surface than to said inside surface.

15. A belt as set forth in claim 12 in which each of said yarns and plies has RFL impregnated therein helping to hold same in its twisted condition.

16. A belt as set forth in claim 15 in which said tension section has a fabric cover thereon defining said outside surface of said belt and said compression section has a fabric cover thereon defining said inside surface of said belt.

17. A belt as set forth in claim 12 in which each of said sections is made primarily of a rubber compound.

18. A belt as set forth in claim 12 in which the value of K in said equation has a numerical value ranging between 70 and 95.

19. A belt as set forth in claim 12 in which said twist of said plies in turns per inch in said opposite direction is approximately equal to the twist of said yarns in turns per inch in said one direction.

20. A belt as set forth in claim 12 in which said twist of said plies in turns per inch in said opposite direction is less than one half the twist of said yarns in turns per inch in said one direction.

* * * * *

UNITED STATES PATENT OFFICE
CERTIFICATE OF CORRECTION

Patent No. 4,083,260     Dated April 11, 1978

Inventor(s) Douglas W. Carlson and Jack Nelson

It is certified that error appears in the above-identified patent and that said Letters Patent are hereby corrected as shown below:

Column 2, line 44, "$TM = t \times d^{1/2} \times K$" should be
-- $TM = t \times d^{1/2}/K$ --

Column 5, line 21, "$TM = t \times d^{1/2} \times K$" should be
-- $TM = t \times d^{1/2}/K$ --

Column 6, line 13, "$TM = t \times d^{1/2} \times K$" should be
-- $TM = t \times d^{1/2}/K$ --

Signed and Sealed this

*Twenty-fourth* Day of *October 1978*

[SEAL]

Attest:

RUTH C. MASON
*Attesting Officer*

DONALD W. BANNER
*Commissioner of Patents and Trademarks*